United States Patent
Gray et al.

(10) Patent No.: US 11,308,890 B2
(45) Date of Patent: Apr. 19, 2022

(54) POWER LINE COMMUNICATION SIGNAL DETECTOR

(71) Applicant: Huayuan Semiconductor (Shenzhen) Limited Company

(72) Inventors: Richard Landry Gray, Taipei (TW); Li-Lun Chi, Taipei (TW)

(73) Assignee: Huayuan Semiconductor (Shenzhen) Limited Company, Shenzhen (CN)

(*) Notice: Subject to any disclaimer, the term of this patent is extended or adjusted under 35 U.S.C. 154(b) by 0 days.

(21) Appl. No.: 16/945,379

(22) Filed: Jul. 31, 2020

(65) Prior Publication Data

US 2022/0036831 A1 Feb. 3, 2022

(51) Int. Cl.
*G09G 3/3291* (2016.01)
*H04B 3/54* (2006.01)

(52) U.S. Cl.
CPC ........... *G09G 3/3291* (2013.01); *H04B 3/54* (2013.01); *G09G 2320/0626* (2013.01); *G09G 2330/028* (2013.01)

(58) Field of Classification Search
CPC ......... G09G 3/3291; G09G 2320/0626; G09G 2330/028; H04B 3/54; H01L 33/24; H01L 33/62
See application file for complete search history.

(56) References Cited

U.S. PATENT DOCUMENTS

| 10,937,356 B2* | 3/2021 | Jeong | G09G 3/2007 |
| 2011/0069095 A1* | 3/2011 | Kim | G09G 3/342 |
| | | | 345/690 |
| 2020/0235078 A1* | 7/2020 | Jang | H01L 33/24 |

* cited by examiner

*Primary Examiner* — Kenneth Bukowski
(74) *Attorney, Agent, or Firm* — Fenwick & West LLP

(57) ABSTRACT

Embodiments relate to a signal detector circuit suitable for a display device that detects and decodes a power line communication signal. The signal detector circuit includes an averaging circuit, a comparator, a sampling circuit, a decoder circuit, and a regulator circuit. The averaging circuit receives the power line communication signal and averages the power line communication signal over time to generate an average signal. The comparator compares the average signal to the power line communication signal and generates a comparison signal. The sampling circuit samples the comparison signal according to a sample timing of a clock signal and generates a sampled signal. The decoder circuit decodes the sampled signal and generates a decoded output signal. The regulator circuit receives the power line communication signal and generates supply voltage to power the comparator, the sampling circuit, and the decoder circuit.

21 Claims, 13 Drawing Sheets

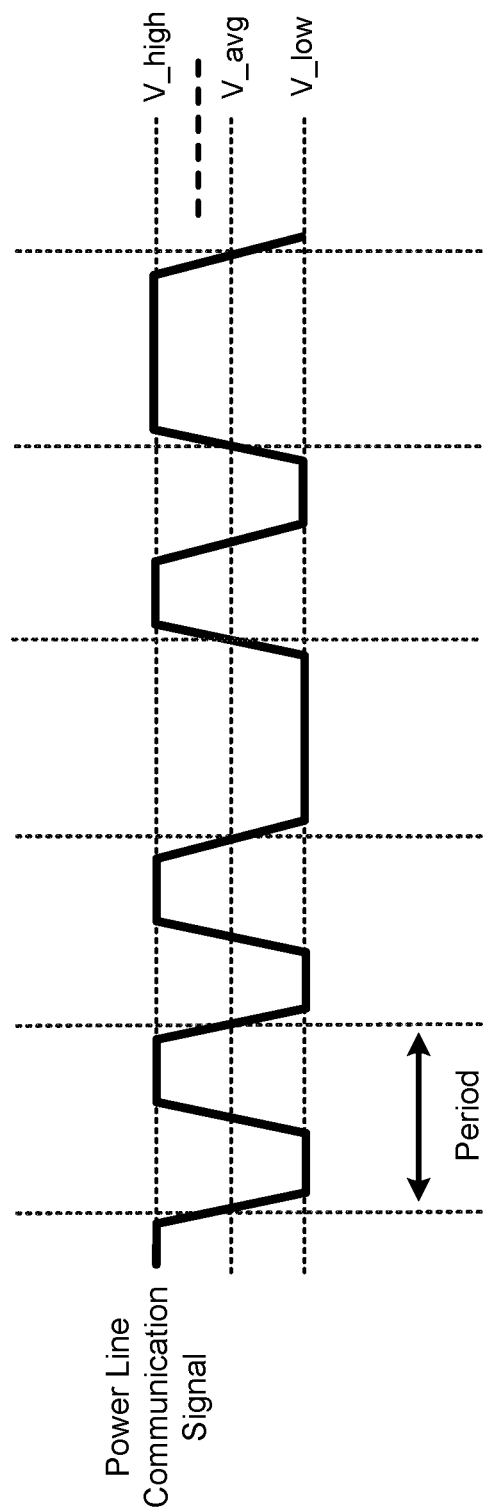

POWER LINE COMMUNICATION SIGNAL DETECTOR

BACKGROUND

This disclosure relates generally to a power line communication signal detector, and more specifically to a power line communication signal detector suitable for a driver circuit in a display device.

In power line communication, a power line communication driver provides a power line communication signal that supplies both power and data to a power line communication receiver. A DC voltage component of the power line communication signal may drive an electronic device while the data component may be extracted to control operation of the device. Power line communication can beneficially reduce the number of lines and pins needed to operate the device. However, conventional power line communication systems are not suitable for driving large arrays of devices at high data rates because they are prone to transient signals in the supply voltage that can interfere with operation.

SUMMARY

Embodiments relate to a signal detector circuit that detects and decodes data encoded in a power line communication signal. The signal detector circuit includes an averaging circuit, a comparator, a sampling circuit, and a decoder circuit. The averaging circuit receives the power line communication signal and averages the power line communication signal over time to generate an average signal. The comparator compares the power line communication signal to the average signal to generate a comparison signal. The sampling circuit samples the comparison signal according to a sample timing of a clock signal to generate a sampled signal. The decoder circuit decodes the sampled signal to generate a decoded output signal. The signal detector circuit further includes a regulator circuit to receive the power line communication signal and to generate supply voltage to power the comparator, the sampling circuit, and the decoder circuit.

Embodiments also relate to a display device that operates using a power line communication signal detector. The display device includes an array of light emitting diode (LED) zones each comprising one or more LEDs that generate light in response to respective driver currents. The display device further includes a group of driver circuits to each drive at least one of the LED zones by controlling the respective driver currents in response to driver control signals. Each driver circuit includes a power line communication input pin for receiving a power line communication signal, a signal detector circuit for generating a driver control signal based on the power line communication signal, and a regulator circuit for generating a supply voltage based on the power line communication signal. The display device further includes a power communication line providing the power line communication signal to the power line communication input pin of each of the driver circuits in the group of driver circuits. A control circuit generates the power line communication signal and provides the power line communication signal on the power communication line to power the group of driver circuits and to control the display device via the driver control signals.

Embodiments also relate to a driver circuit for a display device that operates using a power line communication signal detector. The driver circuit includes a power line communication input pin to receive a power line communication signal. A signal detector circuit generates a driver control signal based on the power line communication signal. A regulator circuit receives the power line communication signal and generates a supply voltage based on the power line communication signal. Control logic is powered by the supply voltage and generates one or more brightness control signals for controlling a driver current through a LED zone based on the driver control signal. The driver circuit further includes an output pin to couple the LED zone and to sink the driver current through the light emitting diode zone according to the brightness control signals.

BRIEF DESCRIPTION OF THE DRAWINGS

The teachings of the embodiments of the present invention can be readily understood by considering the following detailed description in conjunction with the accompanying drawings.

Figure (FIG. 1A is a circuit diagram of a display device, according to one embodiment.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive aspect matter.

DETAILED DESCRIPTION OF EMBODIMENTS

The Figures (FIGs.) and the following description relate to the preferred embodiments of the present invention by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the disclosure described herein.

Figure 1A:
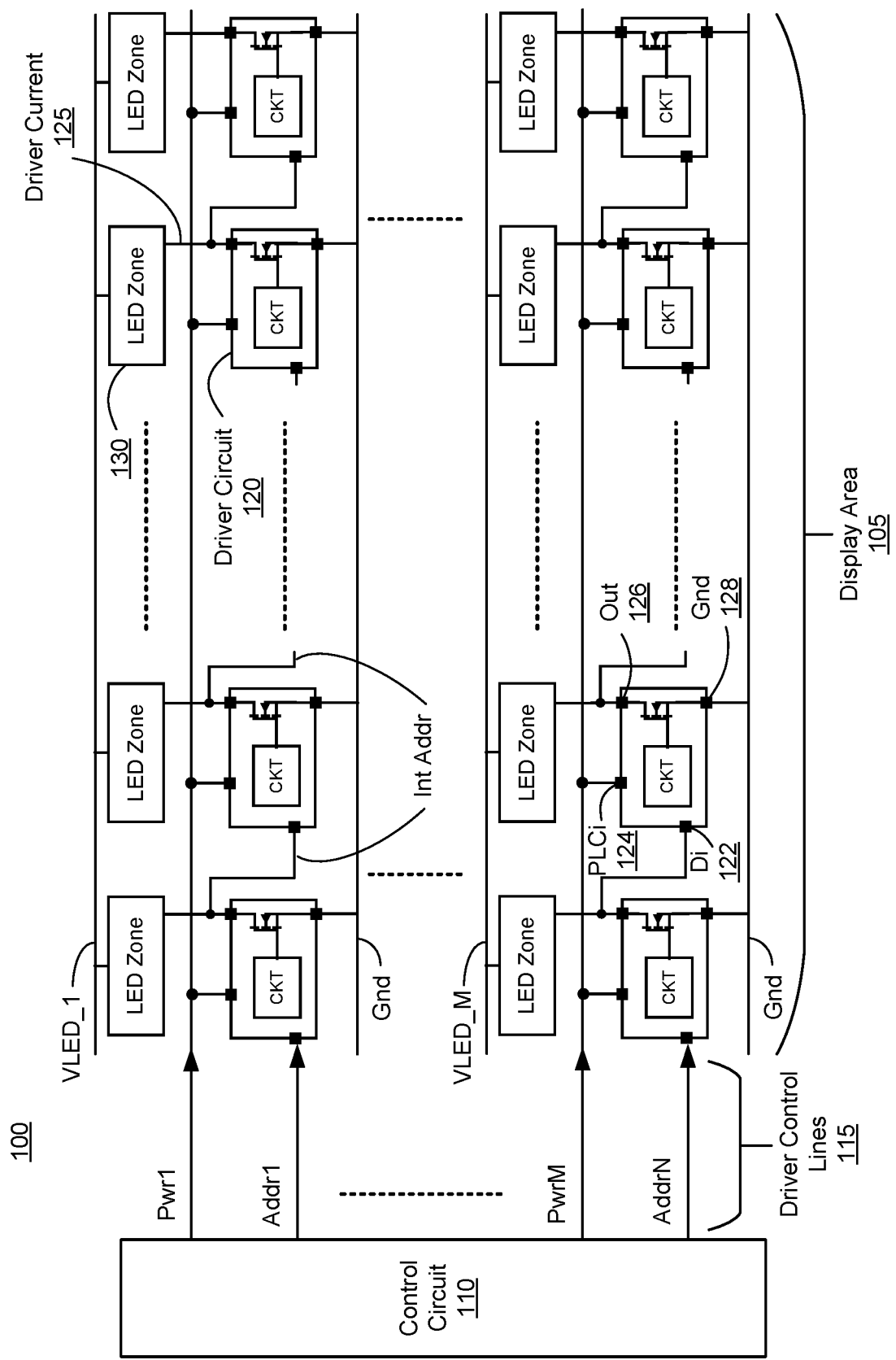
FIG. 1B is a waveform diagram illustrating an example waveform of a power line communication signal, according to one embodiment.
FIG. 1C is a waveform diagram illustrating the operational modes of the display device, according to one embodiment.

FIG. 1A is a circuit diagram of a display device 100 for displaying images or video, according to one embodiment. In various embodiments, the display device 100 may be implemented in any suitable form-factor, including a display screen for a computer display panel, a television, a mobile device, a billboard, etc. The display device 100 may comprise a liquid crystal display (LCD) device or an LED display device. In an LCD display device, LEDs provide white light backlighting that passes through liquid crystal color filters that control the color of individual pixels of the display. In an LED display device, LEDs are directly controlled to emit colored light corresponding to each pixel of the display. The display device 100 may include a display area 105, driver control lines 115, and a control circuit 110. In various embodiments, the display device 100 may include additional, fewer, or different components.

The display area 105 comprises an array of pixels for displaying images based on data received from the control circuit 110. In various embodiments, the display area 105 may include LED zones 130, a set of distributed driver circuits 120, power supply lines including VLED lines (e.g., VLED_1, . . . VLED_M) and ground (GND) lines, and various signaling lines (e.g., a set of address communication lines Int Addr connecting adjacent driver circuits 120 and power communication lines Pwr). In various embodiments, the display area 105 may include additional, fewer, or different components. The VLED lines provide power to the LED zones 130 (e.g., by supplying power to the anode of the LEDs in the LED zones 130). The GND lines provide a path to ground for the LED zones 130 and the driver circuits 120.

As will be described in further detail below, the display area 105 may be physically structured such that the LED zones 130 are stacked over the driver circuits 120. In other words, an array of LED zones 130 are arranged in a first x-y plane and an array of driver circuits 120 are arranged in a second x-y plane parallel to the first x-y plane. In one configuration, each LED zone 130 is stacked over (i.e., in the z direction) the corresponding driver circuit 120 that drives it. Furthermore, the components of the display area 105 (e.g., the LED zones 130 and the driver circuits 120) may be integrated on the same substrate and in a same package as further described in FIGS. 4A-4C. This structure enables a display device 100 in which the driver circuits 120 are distributed in the display area 105 and therefore enables a more compact display device 100 than in devices where the driver circuits 120 are external to the display area 105.

The LED zones 130 may be arranged in a two-dimensional array (e.g., in rows and columns). The LED zones 130 each comprise one or more LEDs that each generate light that has a brightness dependent on its respective driver currents 125. In an LCD display, an LED zone 130 may comprise one or more LEDs that provides backlighting for a backlighting zone, which may include a one-dimensional or two-dimensional array of pixels. In an LED display, the LED zone 130 may comprise one or more LEDs corresponding to a single pixel of the display device 100 or may comprise a one-dimensional array or two-dimensional array of LEDs corresponding to an array of pixels (e.g., one or more columns or rows). For example, in one embodiment, the LED zone 130 may comprise one or more groups of red, green, and blue LEDs that each correspond to a sub-pixel of a pixel. In another embodiment, the LED zone 130 may comprise one or more groups of red, green, and blue LED strings that correspond to a column or partial column of sub-pixels or a row or partial row of sub-pixels. For example, an LED zone 130 may comprise a set of red sub-pixels, a set of green sub-pixels, or a set of blue sub-pixels.

The LEDs may be organic light emitting diodes (OLEDs), inorganic light emitting diodes (ILEDs), mini light emitting diodes (mini-LEDs) (e.g., having a size range between 100 to 300 micrometers), micro light emitting diodes (micro-LEDs) (e.g., having a size of less than 100 micrometers), white light emitting diodes (WLEDs), active-matrix OLEDs (AMOLEDs), transparent OLEDs (TOLEDs), or some other type of LEDs.

The driver circuits 120 drive the LED zones 130 by controlling the respective driver currents 125 to the LED zones 130 in response to driver control signals. In one embodiment, the driver circuits 120 are distributed in the display area 105 and arranged in a two-dimensional array (e.g., in rows and columns) in correspondence with the LED zones 130. In an embodiment, a driver circuit 120 controls a driver current 125 supplied by VLED via an output pin 126 to control brightness of one LED zone 130 based on the driver control signals. For example, brightness of the LED zone 130 generally increases with increasing driver current 125.

In an embodiment, the driver circuits 120 may be arranged in groups that share a common set of driver control lines 115, VLED lines, and GND lines. For example, the driver circuits 120 within a group are coupled to a common power communication line Pwr and are each indirectly controlled by a common address communication line Addr (as will be described in further detail below). In an example embodiment, the driver circuits 120 in one group are daisy-chained together via a set of address communication lines that couple adjacent driver circuits 120 (e.g., from the output pin 126 of one driver circuit 120 to a data input pin 122 of the next driver circuit 120). In the illustrated embodiment of FIG. 1A, each row of the display device corresponds to a group of driver circuits 120 that shares common driver control lines 115, VLED lines, and GND lines. In other embodiments, a group of driver circuits 120 may correspond to a partial row of the display area 105 or a full or partial column of the display area 105. In another embodiment, a group of driver circuits 120 may correspond to a block of adjacent driver circuits 120 that may span multiple rows and columns.

The driver circuits 120 may operate in various modes including at least an addressing mode, a configuration mode, and an operational mode. During the addressing mode, the control circuit 110 assigns a unique address to each of the driver circuits 120 within a group that is utilized to broadcast further commands and data in the configuration and operational modes. During the configuration mode, the control circuit 110 configures the driver circuits 120 with one or more operating parameters (e.g., overcurrent thresholds, overvoltage thresholds, clock division ratios, and/or slew rate control). During the operational mode, the control circuit 110 provides control data to the driver circuits 120 that causes the driver circuits 120 to control the respective driver currents 125 to the LED zones 130, thereby controlling brightness. In other embodiments, the modes of operation of the display device 100 may include additional, fewer, or different modes of operation. For example, the modes of operation may include an initialization mode and an off mode.

The driver circuit 120 may include a four-pin configuration as shown in the illustrated example of FIG. 1. In the four-pin configuration, the driver circuit 120 may include a data input pin (Di) 122, a power line communication input pin (PLCi) 124, an output pin (Out) 126, and a ground pin (Gnd) 128. In an embodiment, the output 126 may instead comprise a set of pins to control multiple channels of the LED zone 130. For example, the output 126 may include three pins to control red, green, and blue channels of the LED zones 130.

The data input pin 122 is used in the addressing mode to receive an incoming addressing signal via one of the common address communication lines (e.g., Addr1, Addr2, . . . AddrN) from the control circuit 110 (in the case of the first driver circuit 120 in each group) or via one of the address communication lines Int Addr coupling adjacent driver circuits 120 (in the case of remaining driver circuits 120 in each group not directly coupled to the control circuit 110). The incoming addressing signal may be a digital signal that specifies an address of each respective driver circuit 120 as will be described in further detail below. The first driver circuit 120 in each group stores the address specified by the incoming addressing signal and generates an outgoing addressing signal for outputting via the output pin 126. For example, the driver circuit 120 may increment the address by 1 or by another fixed amount and send the incremented address as an outgoing addressing signal to the data input pin 122 of the next driver circuit 120 in the group. Waveforms illustrating the addressing scheme are described in further detail in FIG. 1C.

The output pin 126 serves a dual-purpose dependent on the mode of operation. In the addressing mode of the display device 100, the output pin 126 provides the outgoing addressing signal to the next driver circuit 120 in the group of driver circuits 120 as described above. In the operational mode of the display device 100, the output pin 126 is coupled to sink current from a corresponding LED zone 130 to control supply of the driver current 125. In one embodiment, the driver circuit 120 includes more than one output pin 126. For example, in an LED display, the LED zone 130 may comprise three or more LEDs or LED strings corresponding to three sub-pixels (e.g., a red sub-pixel, a green sub-pixel, and a blue sub-pixel), and the driver circuit 120 may include three output pins 126, one for each color channel.

Figure 1C:
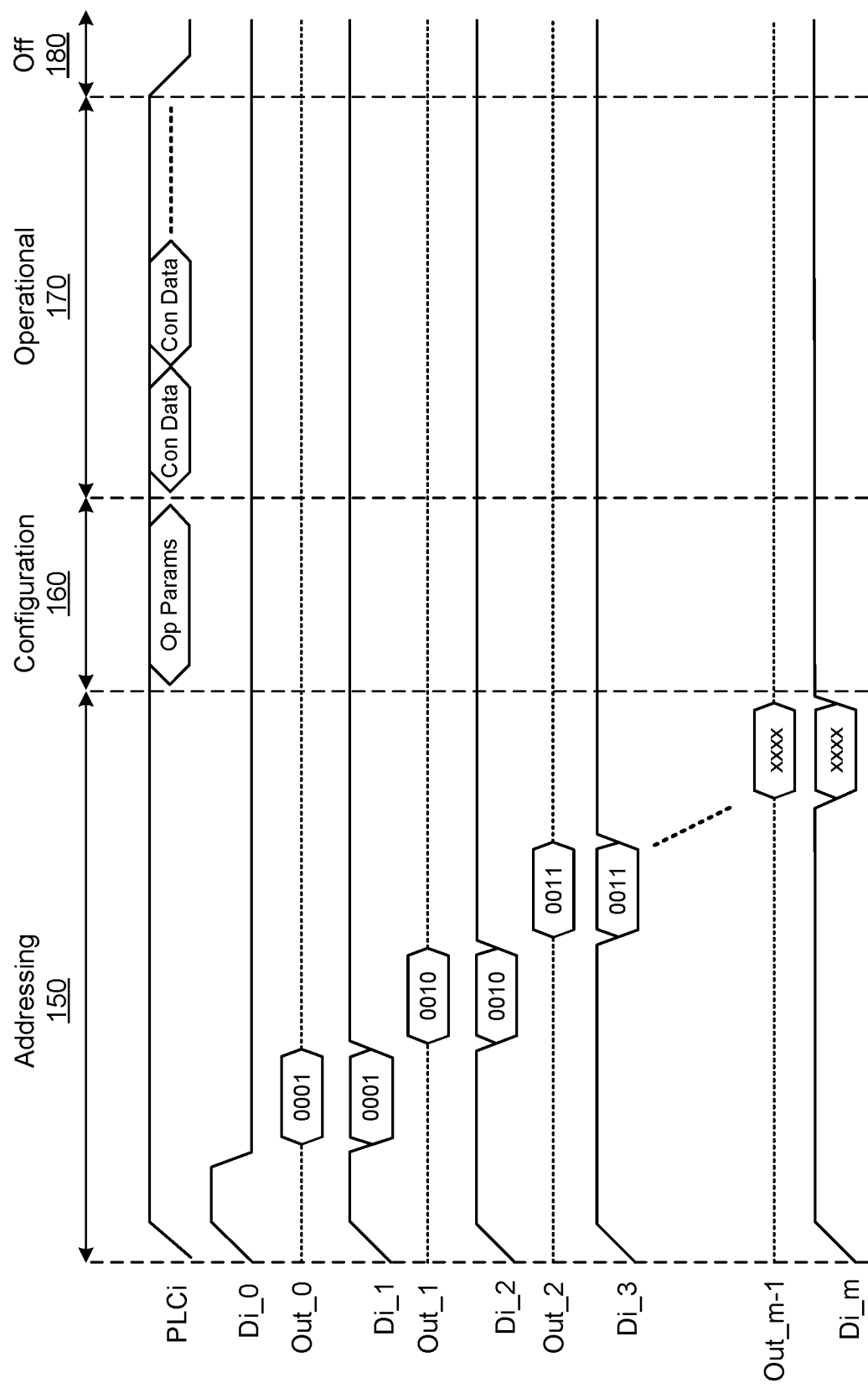

The power line communication input pin 124 is configured to receive a power line communication signal from the control circuit 110 via the common power communication lines (e.g., Pwr1, Pwr2, . . . PwrM) for each group. The power line communication signal includes a supply voltage that may be modulated to encode the driver control signal or other control information as digital data. For example, the power line communication signal may encode operating parameter information or control data information for operating the driver circuit 120. Specifically, during the configuration mode, the power line communication signal provides as digital data, one or more operating parameters (e.g., various overcurrent thresholds or overvoltage thresholds to protect the LEDs from overstress, different clock division ratios, and slew rate control of the driver current 125). During the operational mode, the power line communication signal provides control data (e.g., brightness control information) for the LED zones 130. The brightness control information may include one or more address words to identify a driver circuit 120 within a group of the driver circuits 120 and one or more data words for controlling brightness of the LED zone 130 by controlling the driver current 125 of the identified driver circuit 120. FIGS. 1B and 1C provide example waveforms associated with the power line communication signal. In some embodiments, the power line communication signal supplies a direct current voltage between 3 and 12 volts for the supply voltage. In one embodiment, the power line communication signal may provide a power supply voltage of more than 4.5 volts with a digital data signal having a maximum data rate of up to 2 megahertz (MHz) with a 0.5 peak-to-peak voltage signal.

The ground pin 128 is configured to provide a path to a ground line for the driver circuit 120, which may be common to the corresponding LED zone 130.

The control circuit 110, illustrated in FIG. 1A, generates the address communication signal and the power line communication signal to control the display area 105 via the common driver control lines 115 (as described in further detail above). In one example implementation, a number (M) of common power communication lines and a number (N) of common address communication lines are equal (e.g., M=N).

In another embodiment, a shared power line provides power to both the driver circuits 120 and the LED zones 130. Instead of using power line communication, a digital signal uses clock-less shift registers to serially shift data into the driver circuits 120. The clock-less shift register can be implemented in a number of ways. In one embodiment, biphase mark code encoding is used to extract a clock and shift data into the driver circuits 120. The data could also be shifted all the way through the each of the driver circuits 120 in the serial chain and then shifted out again to be used for error detection. In this embodiment, data is written to all the driver circuits 120 each time the brightness control signal changes. In this embodiment, the driver circuits 120 are not necessarily individually addressable.

FIG. 1B is a waveform diagram illustrating an example waveform of a power line communication signal, according to one embodiment. The power line communication signal switches between high data voltages V_high and low data voltages V_low to encode the digital data (e.g., operating parameters or brightness control information) that results in an average voltage of approximately V_avg. In one example embodiment, the high data voltage V_high is 5.5 volts, the low data voltage V_low is 4.5 volts, and the average voltage V_avg is 5 volts. The digital data may be encoded using biphase mark code encoding. In this encoding scheme, logic values are represented by the presence or absence of transitions in each period. For example, periods including a transition may represent logic high values and periods without transitions may represent logic low values. Furthermore, in this encoding, the signal also transitions between logic levels in between each period. This encoding scheme beneficially ensures that the power line communication signal maintains an average voltage V_avg very close to the midpoint between the logic levels in order to provide a relatively stable direct current supply voltage that can be extracted from the power line communication signal to power the driver circuits 120. Another advantage of this scheme is that it does not require a separate clock signal and can be implemented on a single wire.

FIG. 1C is a waveform diagram illustrating the operational modes of the display device 100, according to one embodiment. The three modes of operation (i.e., the addressing mode 150, the configuration mode 160, and the operational mode 170) of the display device 100 are depicted along with an off mode 180. FIG. 1C illustrates the power line communication signal received at a power line communication input pin (PLCi) 124, the address communication signals received at the data input pins 122 (e.g., Di_0, Di_1, . . . Di_m), and the address communication signals provided by the output pins 126 (e.g., Out_0, Out_1, . . . Out_m-1) of the driver circuits 120 in a group of driver circuits 120 during the various modes of operation.

During the addressing mode 150 of operation, the power line communication signal received at the power line communication input pin 124 transitions from low to high (i.e., the driver circuits 120 begin to receive a supply voltage) at the beginning of the addressing mode 150. The address communication signals propagate through the data input pins 122 and output pins 126 of the driver circuits 120 to assign the respective addresses to the driver circuits 120. For instance, the control circuit 110 outputs a logic high signal on the common address communication line Addrn for the group n and the first driver circuit 120 in group n of driver circuits 120 receives the high signal at its data input pin 122 (i.e., Di_0) as an incoming addressing signal. Responsive to detecting the high signal on Di_0, the driver circuit sets its address to an initial address value (e.g., 0000). The first driver circuit 120 stores the address, increments the address value (i.e., increases the address value by one), and provides the incremented address (e.g., 0001) as an outgoing addressing signal via the output pin 126 (i.e., Out_0) and the address communication line Int Addr. The next (successive) driver circuit 120 in group n receives the incremented address (i.e., 0001) at its data input pin 122 (i.e., Di_1) as an incoming addressing signal. The driver circuit 120 similarly stores the address 0001, increments the address, and provides the incremented address (e.g., 0010) as an outgoing addressing signal via the output pin 126 (i.e., Out_1) and the address communication line Int Addr to the next driver circuit 120 in group n. The progression of receiving and storing an address, incrementing the address, and sending the incremented address onto the next driver circuit 120 continues until the addressing mode completes (i.e., all driver circuits 120 in a group of driver circuits 120 have been assigned an address). In alternative embodiments, a different arbitrary addressing scheme may be used in which each driver circuit 120 may generate the next address according to some other function that is not necessarily incrementing. For example, the driver circuits 120 may decrement the address, generate random addresses, or apply some other arbitrary function to generate new addresses.

During the configuration mode 160, the power line communication signal received at the power line communication input pin 124 provides various operating parameters (Op Params) as digital data on the power line communication input pin 124.

During the operational mode 170, the power line communication signal provides control data (Con Data) as digital data modulated onto the supply voltage. The Con Data may be updated with each image frame or video frame. The operational mode 170 continues until the power line communication signal transitions from high to low (i.e., the driver circuits 120 no longer receive a supply voltage) at which point the driver circuits 120 turn off.

Figure 2:
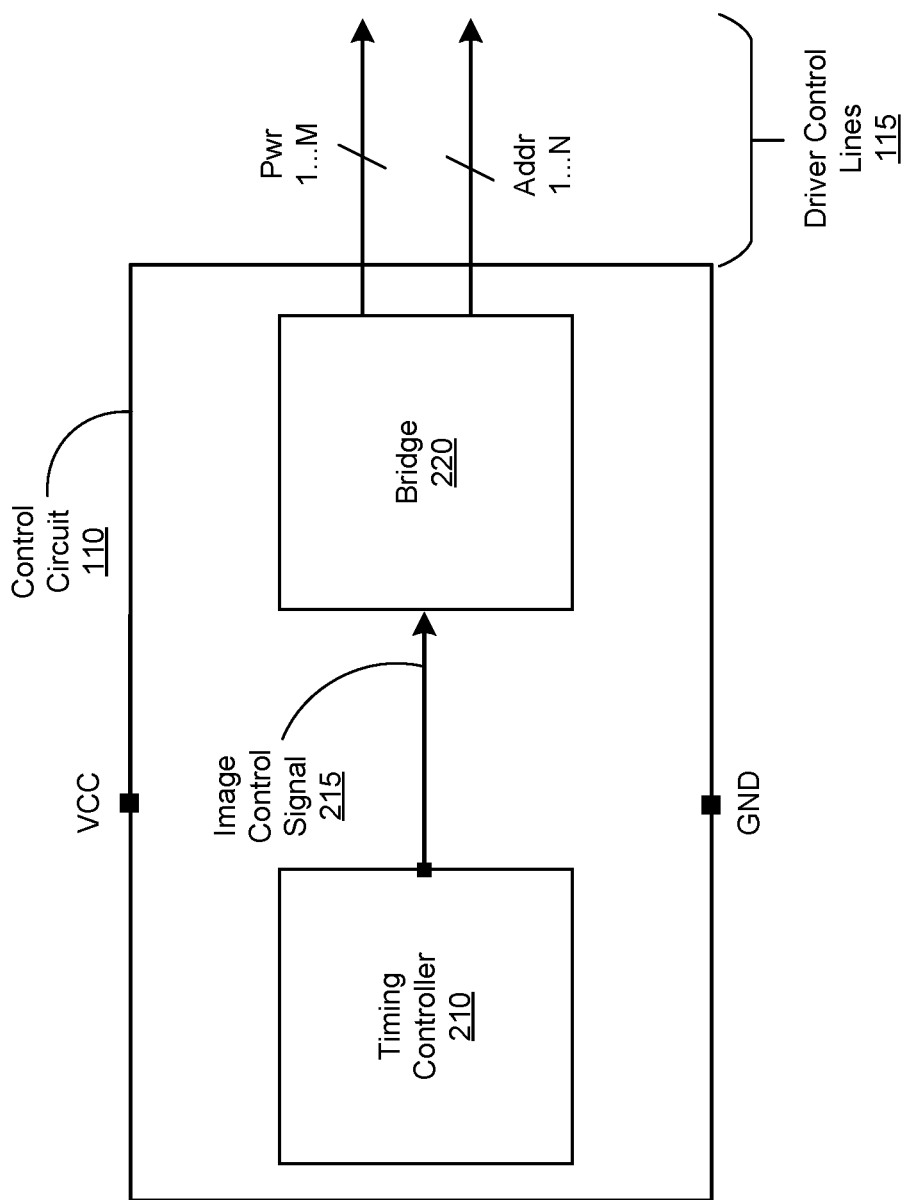
FIG. 2 is an example circuit diagram of a control circuit for a display device, according to one embodiment.

FIG. 2 is an example circuit diagram of a control circuit 110, according to one embodiment. The control circuit 110 generates the address communication signal Addr and the power line communication signal Pwr to control the display device (e.g., the display device 100) and provides the signals via the driver control lines 115 to the driver circuits 120. The control circuit 110 may include a timing controller 210 and a bridge 220. In various embodiments, the control circuit 110 may include additional, fewer, or different components. For example, in some embodiments, the control circuit 110 may be implemented using a field programmable gate array (FPGA) and/or a PHY block. The control circuit 110 is powered by an input voltage (VCC) and is connected to ground (GND). The control circuit 110 may control the display device using either active matrix (AM) or passive matrix (PM) driving methods.

The timing controller 210 generates an image control signal 215 indicating values for driving pixels of the display device 100 and timing for driving the pixels. For example, the timing controller 210 controls timing of image frames or video frames and controls timing of driving each of the LED zones 130 within an image frame or video frame. Furthermore, the timing controller 210 controls the brightness for driving each of the LED zones 130 during a given image frame or video frame. The image control signal 215 is provided by the timing controller 210 to the bridge 220.

The bridge 220 translates the image control signal 215 to the address communication signal Addr and to the driver control signals of the power line communication signal Pwr. For example, the bridge 220 may generate an address communication signal Addr for the first driver circuit 120 in the group of driver circuits 120 during the addressing mode according to the control scheme described above.

Figure 3:
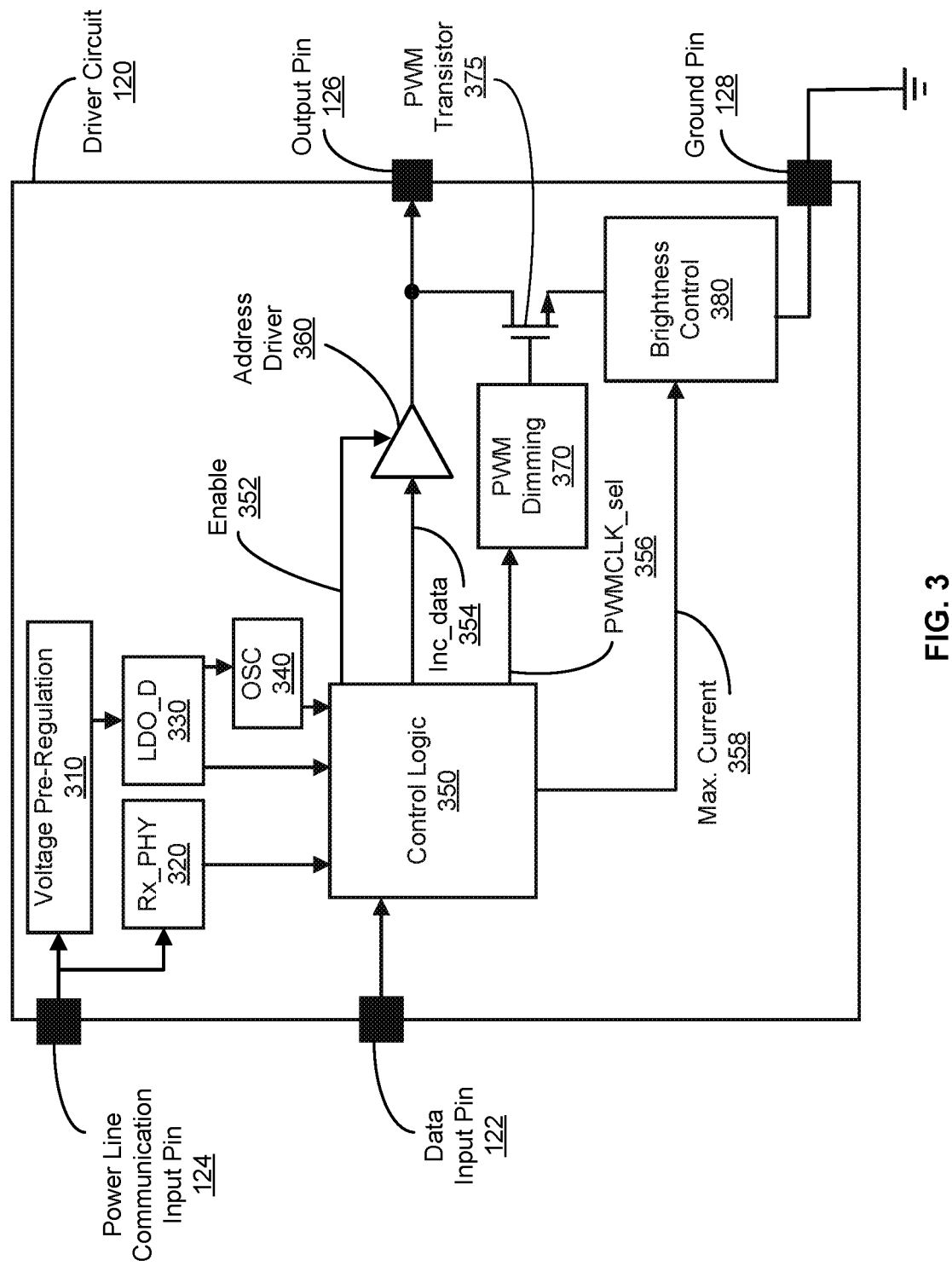
FIG. 3 is an example circuit diagram of a driver circuit for a display device, according to one embodiment.

FIG. 3 is an example circuit diagram of the driver circuit 120, according to one embodiment. The driver circuit 120 may include a voltage pre-regulation circuit 310, an Rx_PHY 320, a low-dropout regulator LDO_D 330, an oscillator OSC 340, control logic 350, an address driver 360, a pulse width modulation (PWM) dimming circuit 370, a transistor 375, and a brightness control circuit 380. In various embodiments, the driver circuit 120 may include additional, fewer, or different components.

The power line communication input pin 124 receives the power line communication signal. The power line communication signal comprises a direct current component (i.e., a supply voltage) and a modulated component (i.e., digital data). The voltage pre-regulation circuit 310 performs preliminary voltage regulation on the power line communication signal and provides a pre-regulated supply voltage to the LDO_D 330. The preliminary voltage regulation can remove substantially all of the digital data from the power line communication signal. In an example embodiment, the voltage pre-regulation circuit 310 comprises a first order RC filter followed by a source follower. In some embodiments, the driver circuit 120 may omit the voltage pre-regulation circuit 310 and the power line communication signal received at the power line communication input pin 124 is provided directly to the LDO_D 330. The LDO_D 330 converts the pre-regulated supply voltage into a direct current voltage (which may be lower than the supply voltage) used to power the oscillator OSC 340, the control logic 350, and other components (not shown). In embodiments where the LDO_D 330 receives the power line communication signal directly, the LDO_D 330 converts the power line communication signal into a direct current voltage. In an example embodiment, the direct current voltage may be 1.8 volts. The oscillator OSC 340 provides a clock signal. In an example embodiment, the maximum frequency of the clock signal is approximately 10.7 MHz. The power line communication signal is provided to the Rx_PHY 320 directly from the power line communication input pin 124. The Rx_PHY 320 is a physical layer that demodulates the power line communication signal and provides the digital data (e.g., driver control signals) to the control logic block 350. In an example embodiment, the Rx_PHY 320 provides a connection with a maximum bandwidth of 2 MHz with a cascade of 36 driver circuit stages.

The control logic 350 receives the driver control signal from the Rx_PHY 320, the direct current voltage from the LDO_D 330, and the clock signal from the oscillator OSC 340. Dependent on the mode of operation of the display device, the control logic 350 may also receive digital data from the incoming addressing signal received at the data input pin 122. Dependent on the mode of operation, the control logic 350 may output an enable signal 352, an incremented data signal Inc_data 354, a PWM clock selection signal PWMCLK_sel 356, and a maximum current signal Max. Current 358. During the addressing mode, the control logic 350 activates the enable signal 352 to enable the address driver 360. The control logic 350 receives an incoming address signal via the data input pin 122, stores the address, and provides the incremented data signal Inc_data 354 representing an outgoing address to the address driver 360. The address driver 360 buffers the incremented data signal Inc_data 354 to the output pin 126 when the enable signal 352 is activated during the addressing mode. The control logic 350 may control the PWM dimming circuit 370 to turn off the transistor 375 during the addressing mode to effectively block the current path from the LEDs.

During the operational mode and configuration modes, the control logic deactivates the enable signal 352 and the output of the address driver 360 is tri-stated to effectively decouple it from the output pin 126. During the operation mode, the PWM clock selection signal PWMCLK_sel 356 specifies a duty cycle for controlling PWM dimming by the PWM dimming circuit 370. Based on the selected duty cycle, the PWM dimming circuit 370 controls timing of an on-state and an off-state of the transistor 375. During the on-state of the transistor 375, a current path is established from the output pin 126 (coupled to the LED zones 130) to the ground pin 128 through the transistor 375 and the brightness control circuit 380 sinks the driver current through the LEDs of the LEDs zones 130. During an off-state of the transistor 375, the current path is interrupted to block current from flowing through the LED zones 130. The brightness control circuit 380 receives the maximum current signal Max. Current 358 from the control logic 350 and controls the current level that flows through the LEDs (from the output pin 126 to the ground pin 128) when the transistor 375 is in the on-state. During the operational mode, the control logic 350 controls the duty cycle of the PWM dimming circuit 370 and the maximum current Max. Current 358 of the brightness control circuit 380 to set the LED zones 130 to the desired brightness.

Figure 4A:
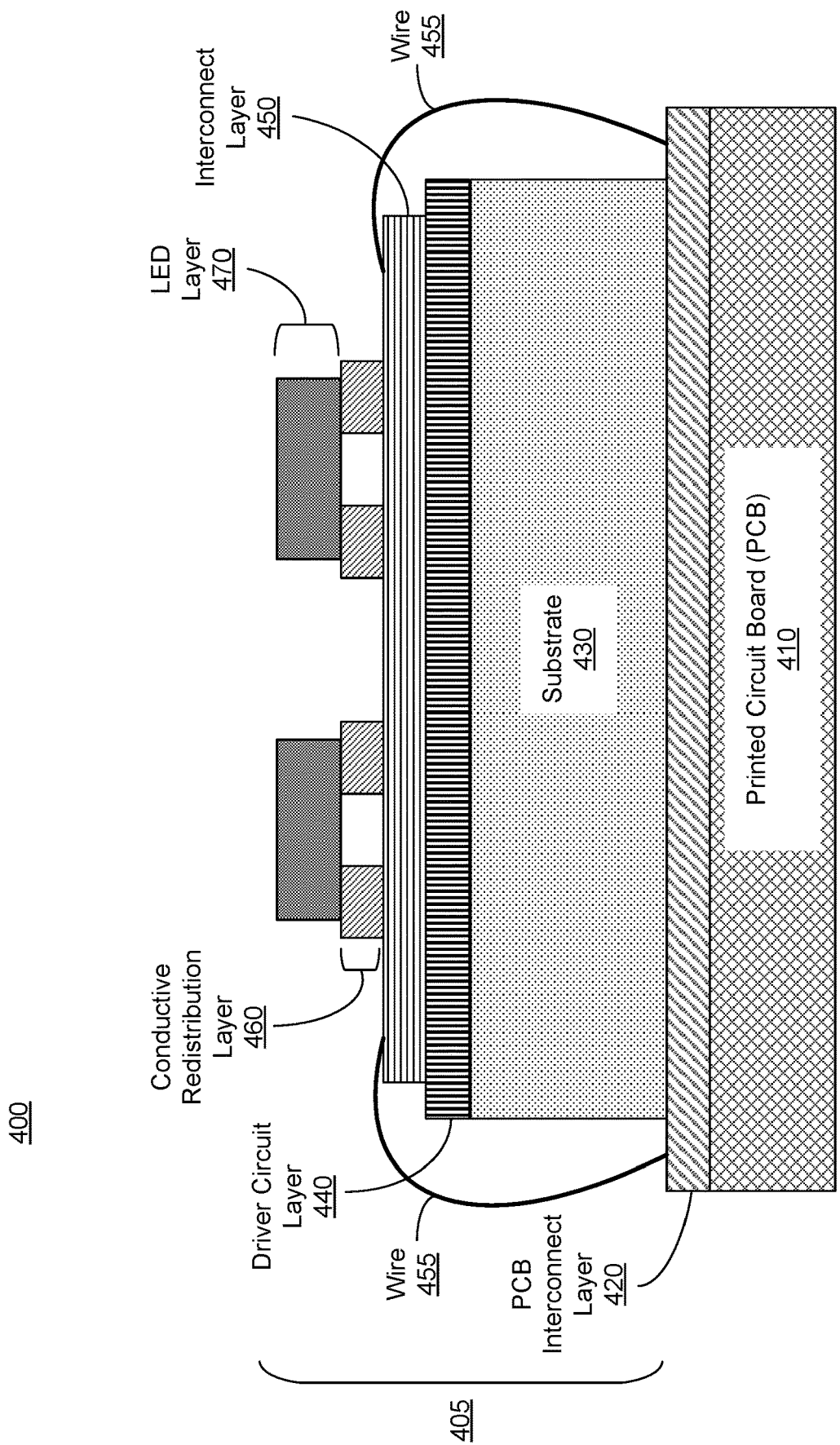
FIG. 4A is a cross sectional view of a first embodiment of an LED and driver circuit that may be utilized in a display device.

FIG. 4A is a cross sectional view of a first embodiment of a display device 400 including an integrated LED and driver circuit 405.

In the example shown in FIG. 4A, the display device 400 includes a printed circuit board (PCB) 410, a PCB interconnect layer 420, and the integrated LED and driver circuit 405 which comprises a substrate 430, a driver circuit layer 440, an interconnect layer 450, a conductive redistribution layer 460, and an LED layer 470. Bonded wires 455 may be included for connections between the PCB interconnect layer 420 and the integrated LED and driver circuit 405. The PCB 410 comprises a support board for mounting the integrated LED and driver circuit 405, the control circuit 110 and various other supporting electronics. The PCB 410 may include internal electrical traces and/or vias that provide electrical connections between the electronics. A PCB interconnect layer 420 may be formed on a surface of the PCB 410. The PCB interconnect layer 420 includes pads for mounting the various electronics and traces for connecting between them.

The integrated LED and driver circuit 405 includes the substrate 430 that is mountable on a surface of the PCB interconnect layer 420. The substrate 430 may be, e.g., a silicon (Si) substrate. In other embodiments, the substrate 430 may include various materials, such as gallium arsenide (GaAs), indium phosphide (InP), gallium nitride (GaN), aluminum nitride (AlN), sapphire, silicon carbide (SiC), or the like.

The driver circuit layer 440 may be fabricated on a surface of the substrate 430 using silicon transistor processes (e.g., BCD processing). The driver circuit layer 440 may include one or more driver circuits 120 (e.g., a single driver circuit 120 or a group of driver circuits 120 arranged in an array). The interconnect layer 450 may be formed on a surface of the driver circuit layer 440. The interconnect layer 450 may include one or more metal or metal alloy materials, such as Al, Ag, Au, Pt, Ti, Cu, or any combination thereof. The interconnect layer 450 may include electrical traces to electrically connect the driver circuits 120 in the driver circuit layer 440 to wire bonds 455, which are in turn connected to the control circuit 110 on the PCB 410. In an embodiment, each wire bond 455 provides an electrical connection. For example, the integrated LED and driver circuit 405 may include five wire bonds including a first wire for providing the driver control signal from the control circuit 110 on the PCB 410 to one or more driver circuits 120 on the driver circuit layer 440, a second wire to provide an incoming address signal to the driver circuit layer 440, a third wire to provide an outgoing address signal from the driver circuit layer 440, a fourth wire to provide the supply voltage (e.g., VLED) to the LEDs in a LED zone 130 on the LED layer 470, and a fifth wire to provide a path to a circuit ground (GND). Additionally, the interconnect layer 450 may provide electrical connections for supplying the driver current between the driver circuit layer 440 and the conductive redistribution layer 460.

In an embodiment, the interconnect layer 450 is not necessarily distinct from the driver circuit layer 440 and these layers 440, 450 may be formed in a single process in which the interconnect layer 450 represents a top surface of the driver layer 440.

The conductive redistribution layer 460 may be formed on a surface of the interconnect layer 450. The conductive redistribution layer 460 may include a metallic grid made of a conductive material, such as Cu, Ag, Au, Al, or the like.

The LED layer 470 includes LEDs that are on a surface of the conductive redistribution layer 460. The LED layer 470 may include arrays of LEDs arranged into the LED zones 130 as described above. The conductive redistribution layer 460 provides an electrical connection between the LEDs in the LED layer 470 and the one or more driver circuits in the driver circuit layer 440 for supplying the driver current and provides a mechanical connection securing the LEDs over the substrate 430 such that the LED layer 470 and the conductive redistribution layer 460 are vertically stacked over the driver circuit layer 440.

Thus, in the illustrated circuit 405, the one or more driver circuits 120 and the LED zones 130 including the LEDs are integrated in a single package including a substrate 430 with the LEDs in an LED layer 470 stacked over the driver circuits 120 in the driver circuit layer 440. By stacking the LED layer 470 over the driver circuit layer 440 in this manner, the driver circuits 120 can be distributed in the display area 105 of a display device 100.

Figure 4B:
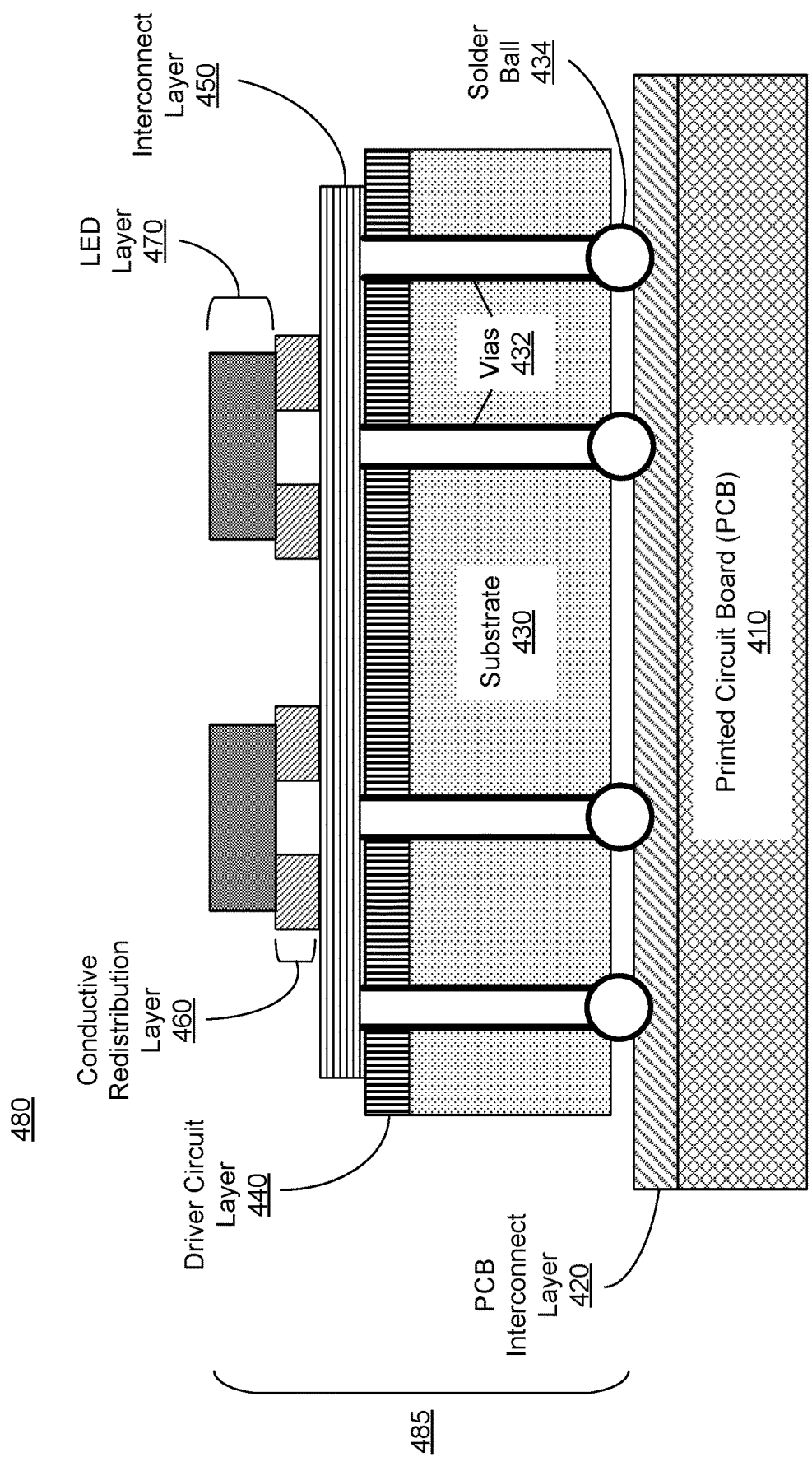
FIG. 4B is a cross sectional view of a second embodiment of an LED and driver circuit that may be utilized in a display device.

FIG. 4B is a cross sectional view of a second embodiment of a display device 480 including an integrated LED and driver circuit 485, according to one embodiment. The device 480 is substantially similar to the device 400 described in FIG. 4A but utilizes vias 432 and corresponding connected solder balls 434 to make electrical connections between the driver circuit layer 440 and the PCB 410 instead of the wires 455. Here, the vias 432 are plated vertical electrical connections that pass completely through the substrate layer 430. In one embodiment, the substrate layer 430 is a Si substrate and the through-chip vias 432 are Through Silicon Vias (TSVs). The through-chip vias 432 are etched into and through the substrate layer 430 during fabrication and may be filled with a metal, such as tungsten (W), copper (C), or other conductive material. The solder balls 434 comprise a conductive material that provide an electrical and mechanical connection to the plating of the vias 432 and electrical traces on the PCB interconnect layer 420. In one embodiment, each via 432 provides an electrical connection for providing signals such as the driver control signal from the control circuit 110 on the PCB 410 to a group of driver circuits 120 on the driver circuit layer 440. The vias 432 may also provide connections for the incoming and outgoing addressing signals, the supply voltage (e.g., VLED) to the LEDs in a LED zone 130 on the LED layer 470, and the path to a circuit ground (GND). For example, five or more vias 432 may be utilized to provide these connections.

Figure 4C:
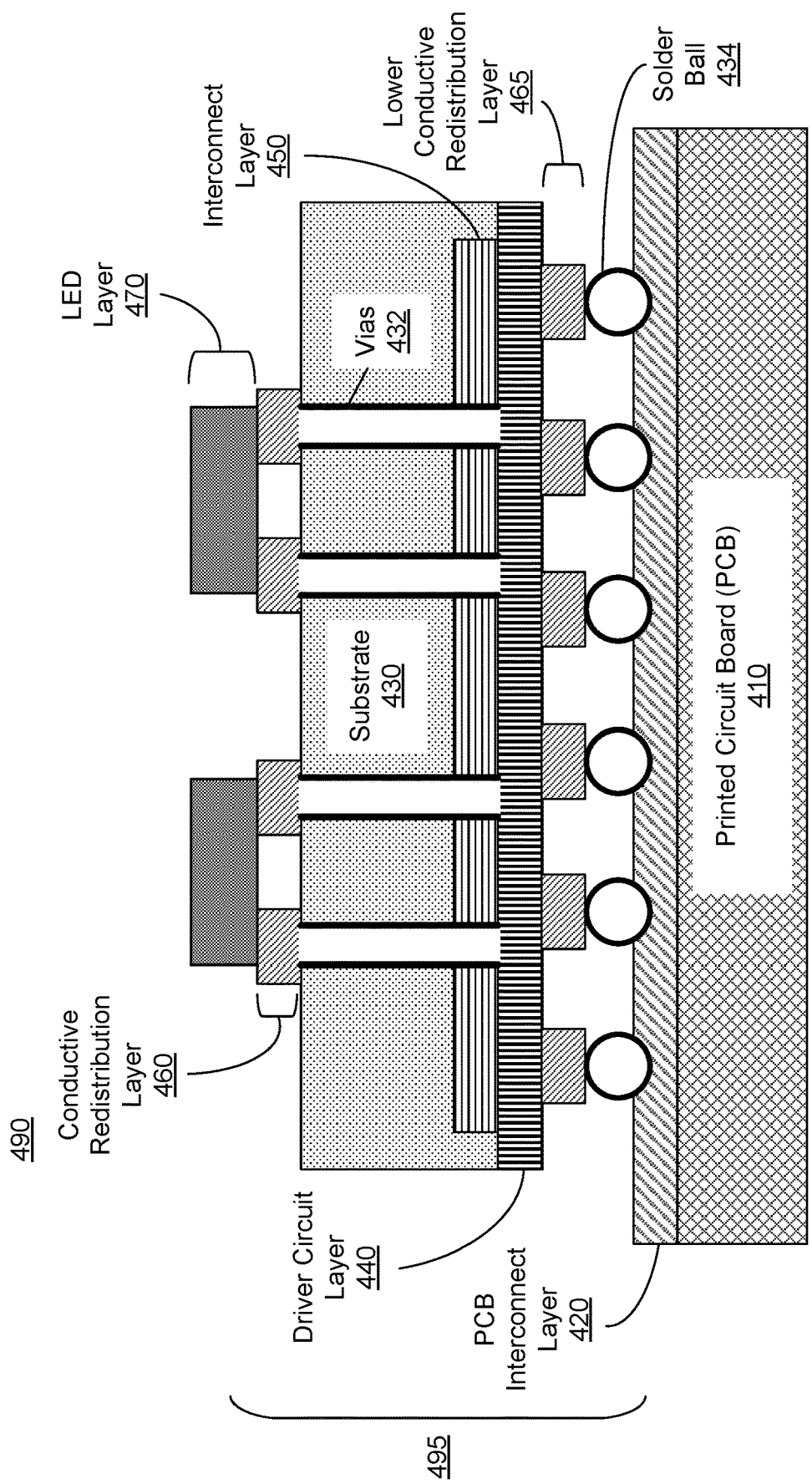
FIG. 4C is a cross sectional view of a third embodiment of an LED and driver circuit that may be utilized in a display device.

FIG. 4C is a cross sectional view of a third embodiment of a display device 490 including an integrated LED and driver circuit 495. The device 490 is substantially similar to the device 480 described in FIG. 4B but includes the driver circuit layer 440 and interconnect layer 450 on the opposite side of the substrate 430 from the conductive redistribution layer 460 and the LED layer 470. In this embodiment, the interconnect layer 450 and the driver circuit layer 440 are electrically connected to the PCB 410 via a lower conductive redistribution layer 465 and solder balls 434. The lower conductive redistribution layer 465 and solder balls 434 provide mechanical and electrical connections (e.g., for the driver control signals) between the driver circuit layer 440 and the PCB interconnect layer 420. The driver circuit layer 440 and interconnect layer 450 are electrically connected to the conductive redistribution layer 460 and the LEDs of the LED layer 470 via one or more plated vias 432 through the substrate 430. The one or more vias 432 seen in FIG. 4C may be utilized to provide the driver currents from the driver circuits in the driver circuit layer 440 to the LEDs in the LED layer 470 and other signals as described above In alternative embodiments, the integrated driver and LED circuits 405, 485, 495 may be mounted to a different base such as a glass base instead of the PCB 410.

Figure 5:
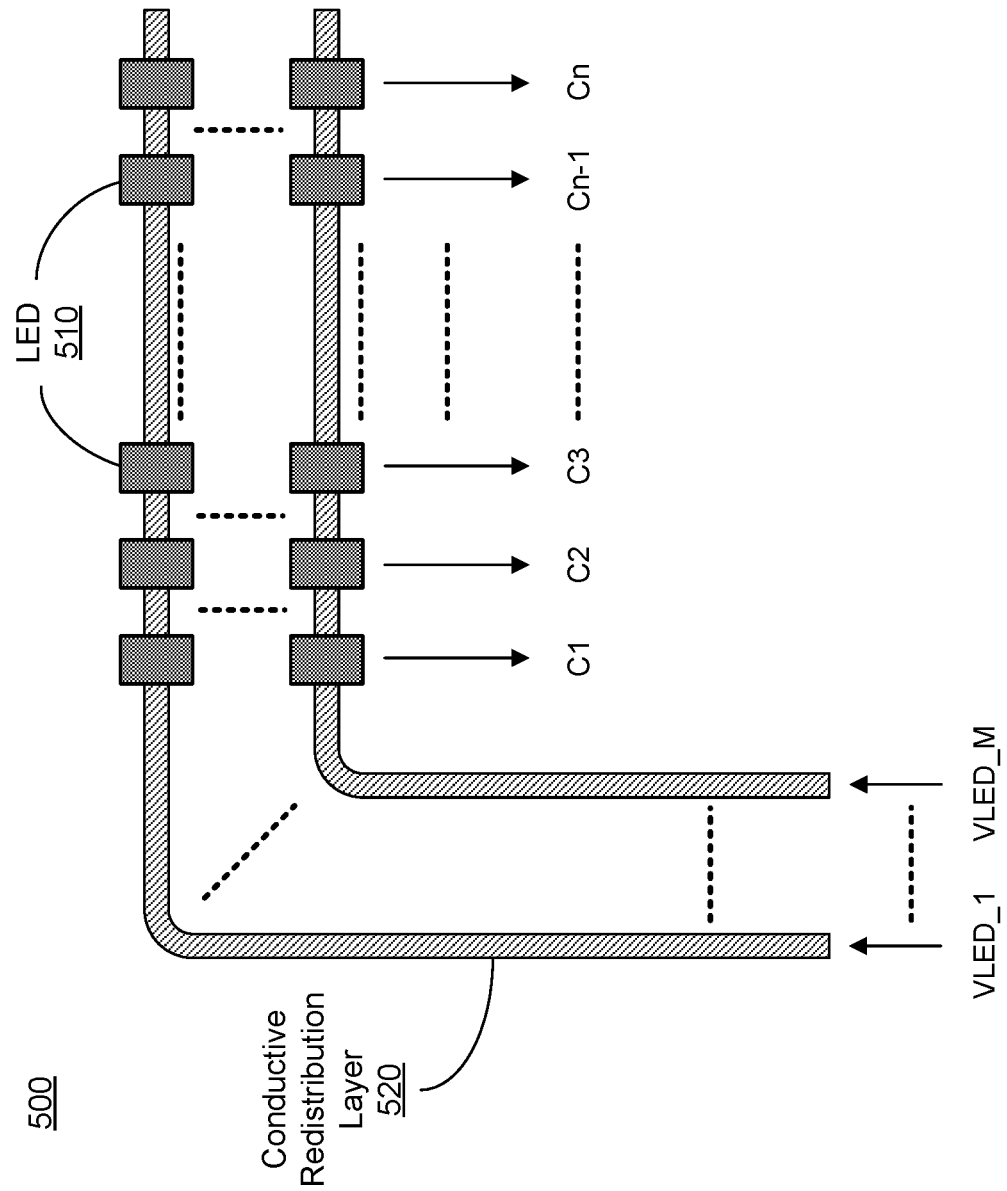
FIG. 5 is a top down view of a display device using an LED and driver circuit, according to one embodiment.

FIG. 5 is a top down view of a display device using an integrated LED and driver circuit 500, according to one embodiment. The circuit 500 can correspond to a top view of any of the integrated LED and driver circuits 405, 485, 495 depicted in FIGS. 4A-4C. A plurality of LEDs 510 is arranged in rows and columns (e.g., C1, C2, C3, . . . Cn-1, Cn) in FIG. 5. For passive matrix architectures, each row of LEDs 510 is connected by a conductive redistribution layer 520 to a demultiplexer which outputs a plurality of VLED signals (i.e., VLED_1 . . . VLED_M). The VLED signals provide power (i.e., a supply voltage) to a corresponding row of LEDs 510 via the conductive redistribution layer 520.

Figure 6:
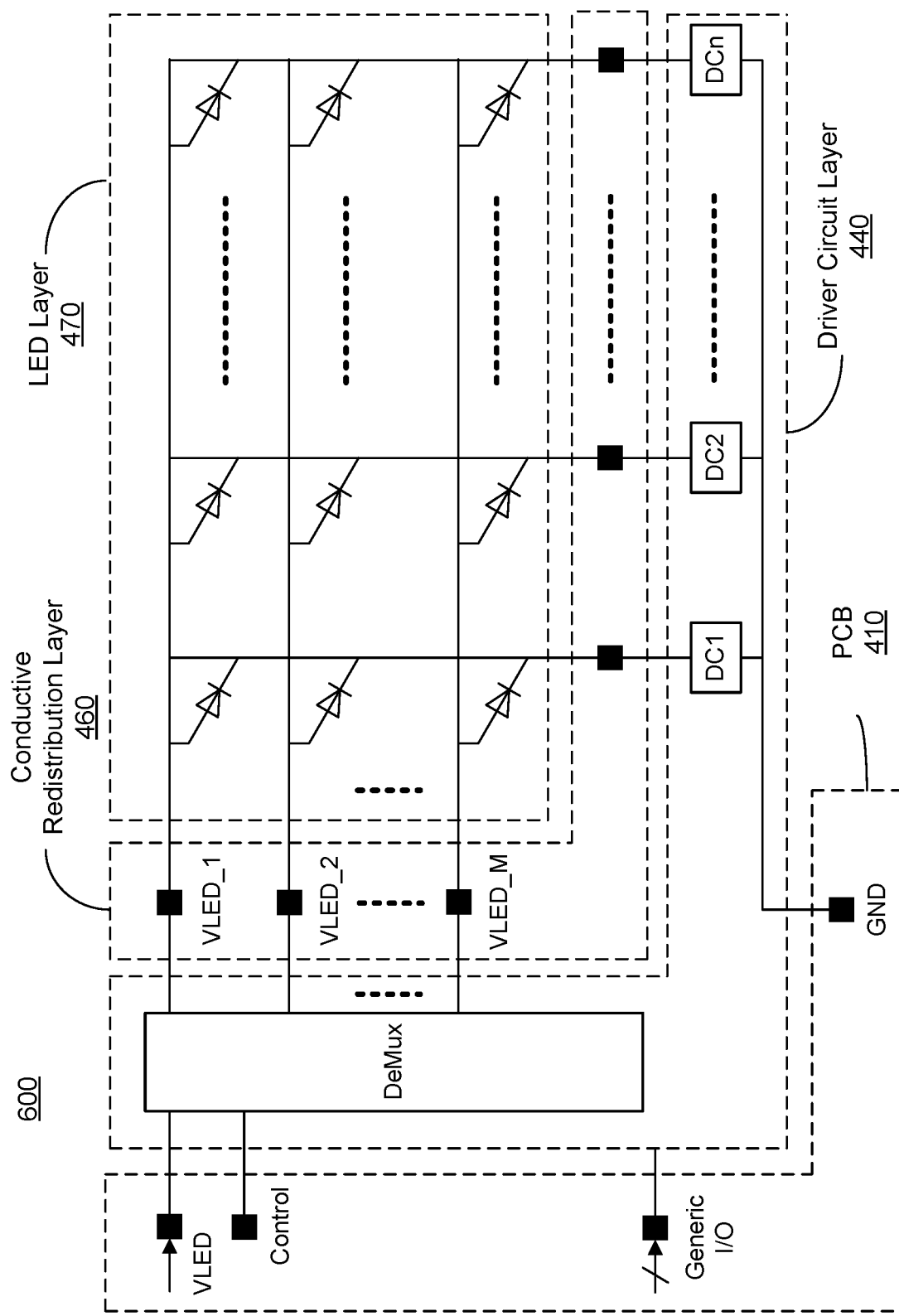
FIG. 6 illustrates a schematic view of several layers of an LED and driver circuit for a display device, according to one embodiment.

FIG. 6 illustrates a schematic view of several layers of a display device 600 with an integrated LED and driver circuit, according to one embodiment. The schematic view includes the PCB 410, the driver circuit layer 440, the conductive redistribution layer 460, and the LED layer 470 as described in FIGS. 4A-4C. The schematic of FIG. 6 shows circuit connections for the circuits 405, 485, 495 of FIGS. 4A-C but does not reflect the physical layout. As described above, in the physical layout, the LED layer 470 is positioned on top of (i.e., vertically stacked over) the conductive redistribution layer 460. The conductive redistribution layer 460 is positioned on top of the driver circuit layer 440 and the driver circuit layer 440 is positioned on top of the PCB 410.

The PCB 410 includes a connection to a power source supplying power (e.g., VLED) to the LEDs, a control circuit for generating a control signal, generic I/O connections, and a ground (GND) connection. The driver circuit layer 440 includes a plurality of driver circuits (e.g., DC1, DC2, . . . DCn) and a demultiplexer DeMux. The conductive redistribution layer 460 provides electrical connections between the driver circuits and the demultiplexer DeMux in the driver circuit layer 440 to the plurality of LEDs in the LED layer 470. The LED layer 470 includes a plurality of LEDs arranged in rows and columns. In this example implementation, each column of LEDs is electrically connected via the conductive redistribution layer 460 to one driver circuit in the driver circuit layer 440. The electrical connection established between each driver circuit and its respective column of LEDs controls the supply of driver current from the driver circuit to the column. In this embodiment, each diode shown in the LED layer corresponds to an LED zone. Each row of LEDs is electrically connected via the conductive redistribution layer 460 to one output (e.g., VLED_1, VLED_2, . . . VLED_M) of the demultiplexer DeMux in the driver circuit layer 440. The demultiplexer DeMux in the driver circuit layer 440 is connected to a power supply (VLED) and a control signal from the PCB 410. The control signal instructs the demultiplexer DeMux which row or rows of LEDs are to be enabled and supplied with power using the VLED lines. Thus, a particular LED in the LED layer 470 is activated when power (VLED) is supplied on its associated row and the driver current is supplied to its associated column.

Figure 7:
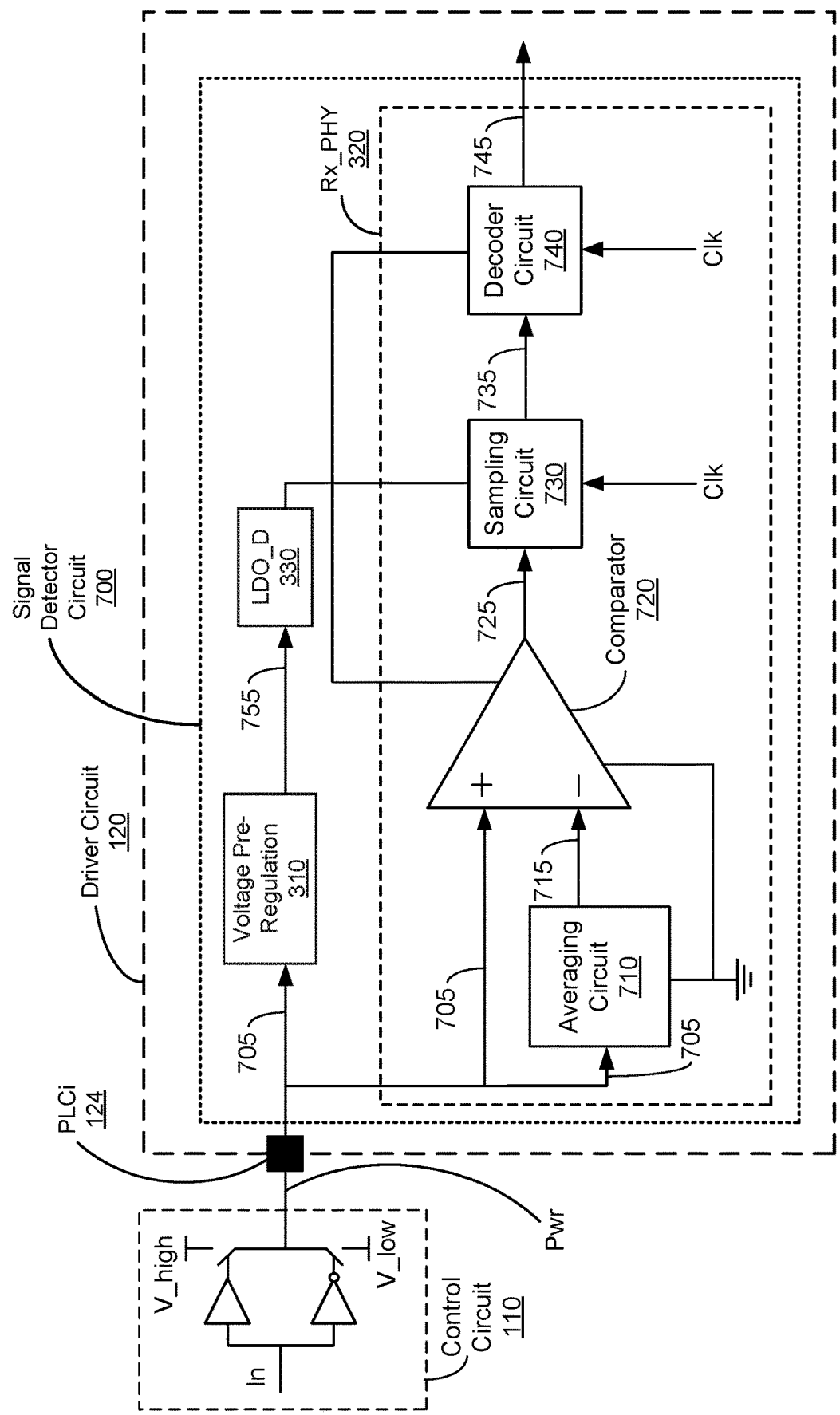
FIG. 7 is an example circuit diagram of a signal detector circuit, according to one embodiment.

FIG. 7 is an example circuit diagram of a signal detector circuit 700, according to one embodiment. The signal detector circuit 700 receives a power line communication signal 705 via a power communication line Pwr. In the illustrated embodiment, the signal detector circuit 700 is included within the driver circuit 120 and receives the power line communication signal 705 via the power line communication input pin PLCi 124. As described earlier, the power line communication signal 705 may contain a modulated component which includes data (digital or analog) and a direct current component which includes the supply voltage. The supply voltage powers control logic 350 and other various components within the driver circuit 120 (not shown in FIG. 7). In some embodiments, the power line communication signal 705 supplies a direct current voltage between 3 and 12 volts.

As described above, the control circuit 110 encodes the supply voltage of the power line communication signal 705 with digital data. The control circuit 110 includes a driver that receives the digital data to be encoded as an input signal IN and switches the output between a high voltage V_high from a high voltage supply or a low voltage V_low from a low voltage supply. Various encoding schemes (e.g., biphase mark code encoding) may be used by the control circuit 110 to encode digital data. In an example embodiment, the encoding scheme encodes the input signal IN such that the control circuit 110 frequently switches between the high voltage V_high and the low voltage V_low and outputs the high voltage V_high and the low voltage V_low in approximately equal amounts of time regardless of the characteristics of the input signal IN. Thus, an average voltage output by the control circuit 110 on the power line communication signal 705 approximates a midpoint voltage between the high voltage V_high and the low voltage V_low. For example, the high voltage V_high is 5 volts, the low voltage is 4 volts, and the average voltage is 4.5 volts.

The signal detector circuit 700 detects and decodes the digital data modulated on the supply voltage provided by the power line communication signal 705. The signal detector circuit 700 may include the voltage pre-regulation circuit 310, the Rx_PHY 320, and the low-dropout regulator LDO_D 330 of the driver circuit 120 all described in more detail in FIG. 3. In various embodiments, the signal detector circuit 700 may include additional, fewer, or different components. The voltage pre-regulation circuit 310 performs preliminary voltage regulation (e.g., removes substantially all of the digital data) on the power line communication signal 705 and provides a pre-regulated supply voltage 755 to the LDO_D 330. The LDO_D 330 receives the pre-regulated supply voltage 755 and generates the supply voltage to power the comparator 720, the sampling circuit 730, and the decoder circuit 740 (and other components of the driver circuit 120 (not shown in FIG. 7)).

The Rx_PHY 320 directly receives the power line communication signal 705 provided by the power communication line Pwr. The Rx_PHY 320 includes an averaging circuit 710, a comparator 720, a sampling circuit 730, and a decoder circuit 740. The averaging circuit 710 receives the power line communication signal 705 and averages the power line communication signal 705 over time to generate an average signal 715. Embodiments of the averaging circuit 710 are described in greater detail in FIGS. 8A and 9A below. The comparator 720 receives the power line communication signal 705 and the average signal 715 to generate a comparison signal 725. The comparison signal 725 comprises a digital signal with logic levels indicating whether the power line communication signal 705 is higher or lower than the average signal 715. The sampling circuit 730 samples the comparison signal 725 according to a sample timing of a clock signal Clk to generate a sampled signal 735. In one embodiment, the clock signal Clk may be provided by an internal oscillator (e.g., the oscillator OSC 340 of the driver circuit 120). The sampling frequency of the sampling circuit 730 may be much higher than the data rate of the power line communication signal 705 in order to accurately sample the signal. The decoder circuit 740 decodes the sampled signal 735 to generate a decoded output signal 745. The decoder circuit 740 utilizes a decoding scheme that is complementary to the encoding scheme utilized by the control circuit 110. For example, the decoder circuit 740 may decode the sampled signal 735 using biphase mark code decoding. The decoded output signal 745 may be provided to the control logic 350 of the driver circuit 120 as a driver control signal. The signal detector circuit 700 beneficially is unaffected by common mode variation in the power line communication signal 705 that may be caused by variations in the supply voltages providing the high and low voltages at the control circuit.

Figure 8A:
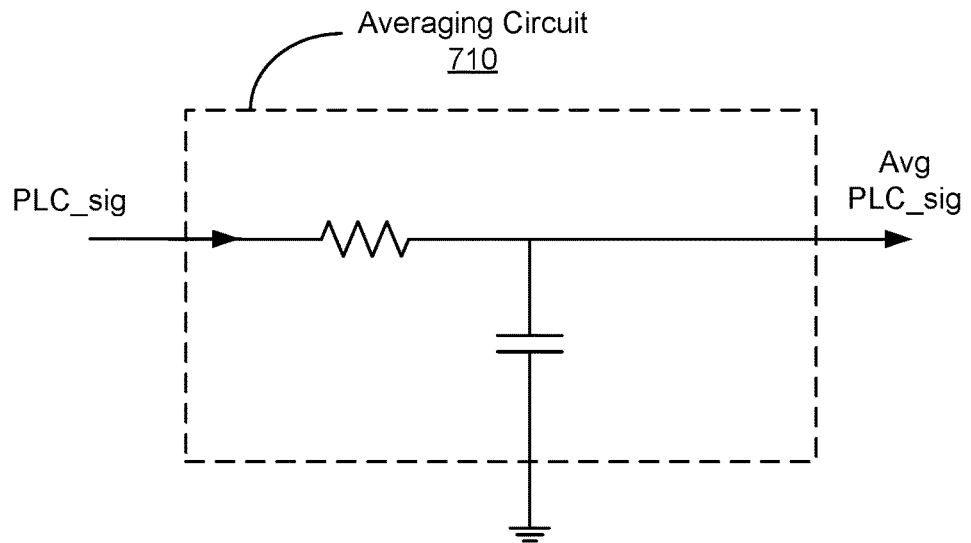
FIG. 8A is a circuit diagram of an example averaging circuit for a signal detector circuit, according to one embodiment.
Figure 8B:
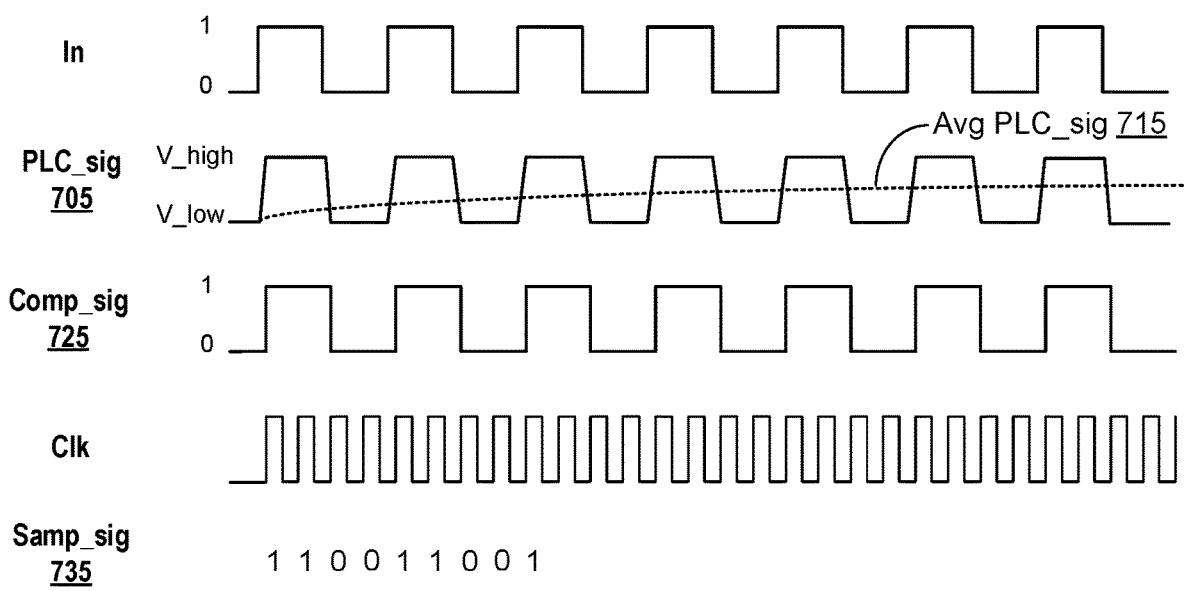
FIG. 8B is a waveform diagram illustrating operation of a signal detector circuit that utilizes the averaging circuit of FIG. 8A.

In one embodiment, illustrated in FIG. 8A, the averaging circuit 710 for the signal detector circuit 700 includes a resistor-capacitor (RC) filter. FIG. 8B illustrates example waveforms associated with operation of the signal detector circuit 700 using the averaging circuit 710. The waveform diagrams depicted in FIG. 8B include an input signal IN, a modulated component of a power line communication signal 705, the average signal 715, a comparison signal 725, a clock signal Clk, and a sampled signal 735. In the illustrated waveform diagram, an example input signal IN oscillates between zero and one (or logic low and logic high). The power line communication signal 705 switches between the high voltage V_high and the low voltage V_low to encode the input signal IN. The average signal 715 may take several clock cycles to stabilize on the average voltage value of the power line communication signal 705. In some embodiments, the average voltage value may be a midpoint value between the high voltage V_high and the low voltage V_low. In other embodiments, the average voltage value may be any voltage value in between the high voltage V_high and the low voltage V_low. The comparison signal 725 represents the comparison between the communication signal 705 and the average signal 715. On a rising edge of the clock signal Clk, the sampling circuit 730 samples the comparison signal 725 and generates the sampled signal 735 (e.g., 1, 1, 0, 0, 1, 1, 0, 0, 1 . . . ). The sampled signal 735 can then be decoded by the decoder circuit 740 to generate the output signal 745.

Figure 9A:
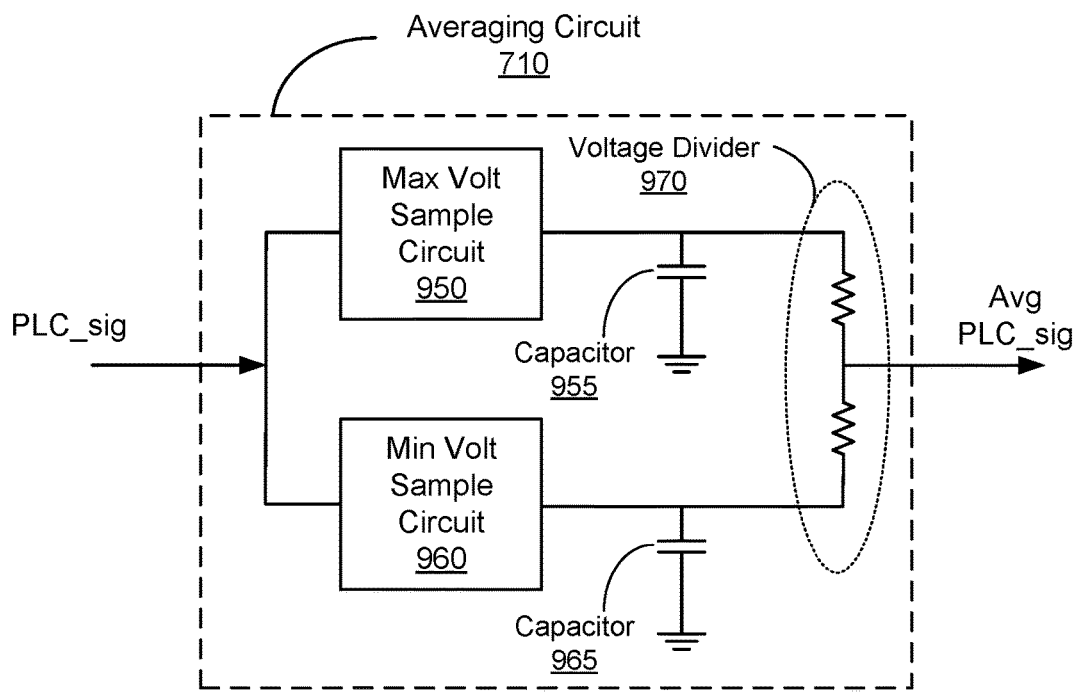
FIG. 9A is a circuit diagram of another example averaging circuit for a signal detector circuit, according to one embodiment.

In another embodiment, illustrated in FIG. 9A, the averaging circuit 710 for the signal detector circuit 700 is implemented as a sample and hold averaging circuit. Here, the averaging circuit 710 includes a maximum voltage sample circuit 950, a minimum voltage sample circuit 960, two capacitors 955, 965, and a voltage divider 970. The maximum voltage sample circuit 950 samples the power line communication signal 705 to detect and sample a maximum voltage of the power line communication signal 705. The maximum voltage is outputted as a voltage across the capacitor 955. The minimum voltage sample circuit 960 samples the power line communication signal 705 to detect and sample a minimum voltage of the power line communication signal 705. The minimum voltage is outputted as a voltage across the capacitor 965. The voltage divider 970 generates the average signal 715 as an intermediate voltage between the maximum voltage from the capacitor 955 and the minimum voltage from the capacitor 965 to generate the average signal 715.

During operation of the signal detector circuit 700 using the averaging circuit 710 illustrated in FIG. 9A, the average signal 715 stabilizes at the average voltage value (e.g., the midpoint value between the high voltage V_high and the low voltage V_low) of the power line communication signal 705 almost immediately and generally much faster than the RC filter circuit of FIG. 8A. This enables the averaging circuit 710 of FIG. 9A to respond very quickly to supply voltage variations.

Figure 9B:
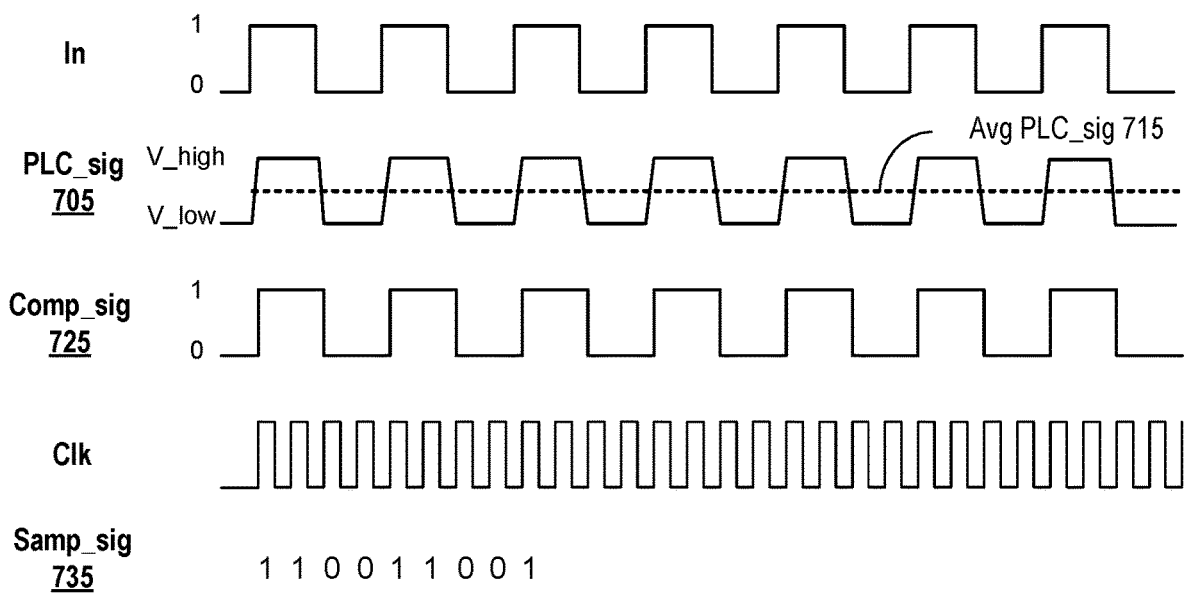
FIG. 9B is a waveform diagram illustrating operation of a signal detector circuit that utilizes the averaging circuit of FIG. 9A.

FIG. 9B is a waveform diagram illustrating operation of the signal detector circuit 700 that utilizes the averaging circuit 710 of FIG. 9A. The waveforms depicted in FIG. 9B are substantially similar to the waveforms depicted in FIG. 8B except that the average signal 715 stabilizes at the average value almost immediately.

In another embodiment (not shown), the sampling circuit 730 and the decoder circuit 740 could be omitted from the signal detector circuit 700. In this embodiment, the output signal 745 could be recovered using other techniques or could be provided directly to a receiver.

In another embodiment, the sampling circuit 730 only detects the maximum voltage of the of power line communication signal 705 but does not directly detect the minimum voltage. Instead, a voltage offset of appropriate polarity is applied by the comparator 720 so that the comparator 720 changes its output state when the power line communication signal 705 is a predefined voltage below the detected maximum voltage. The comparator offset is chosen so as to be approximately half of the expected peak to peak signal amplitude of the power line communication signal 705. For the previous example where the low voltage of the power line communication signal 705 was 4 volts and the high voltage of the power line communication signal 705 was 5 volts, the comparator offset magnitude may be set to 500 millivolts.

In another embodiment the sampling circuit 730 only detects the minimum voltage of the of power line communication signal 705 without necessarily detecting the maximum voltage. Here, a voltage offset of appropriate polarity is applied by the comparator 720 so that the comparator 720 changes its output stage when the power line communication signal 705 is a certain voltage above the detected minimum voltage. Again, the comparator offset is chosen so as to be approximately half of the expected peak to peak signal amplitude of the power line communication signal 705. For the previous example where the low voltage of the power line communication signal 705 was 4 volts and the high voltage of the power line communication signal 705 was 5 volts, the comparator offset magnitude may be set to 500 millivolts.

In an alternative embodiment, the signal detector circuit 700 may be utilized in a display device that does not necessarily have the architecture described in FIGS. 1-6. For example, the signal detector circuit 700 may be used in a display device that does not necessarily include integrated driver and LED circuits, may have different pin configurations, or may operate according to different addressing and communication protocols than those described. Furthermore, the signal detector circuit 700 may be utilized in a communication device that is not necessarily a display driver device. For example, the signal detector circuit 700 may be utilized in various sensor devices (e.g., temperature sensors) or other devices that benefit from power line communication.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

What is claimed is:

1. A signal detector circuit comprising:
   an averaging circuit to receive a power line communication signal and to average the power line communication signal over time to generate an average signal;
   a comparator to compare the power line communication signal to the average signal to generate a comparison signal;
   a sampling circuit to sample the comparison signal according to a sample timing of a clock signal to generate a sampled signal;
   a decoder circuit to decode the sampled signal to generate a decoded output signal; and
   a regulator circuit to receive the power line communication signal and to generate a supply voltage to power the comparator, the sampling circuit, and the decoder circuit.

2. The signal detector circuit of claim 1, wherein the averaging circuit comprises a resistor-capacitor (RC) filtering circuit.

3. The signal detector circuit of claim 1, wherein the averaging circuit comprises:
   a maximum voltage sample circuit to sample and hold a maximum voltage of the power line communication signal;
   a minimum voltage sample circuit to sample and hold a minimum voltage of the power line communication signal; and
   a voltage divider to generate the average signal as an intermediate voltage between the maximum voltage and the minimum voltage.

4. The signal detector circuit of claim 1, wherein the power line communication signal supplies a direct current voltage between 3 and 12 volts that is modulated with digital data.

5. The signal detector circuit of claim 1, wherein the power line communication signal encodes digital data by switching between a low voltage and a high voltage according to an encoding scheme in which an average voltage of the power line communication approximates a midpoint between the low voltage and the high voltage irrespective of the logic values of the digital data.

6. The signal detector circuit of claim 5, wherein the decoder circuit decodes the sampled signal using biphase mark code decoding.

7. A display device comprising:
   an array of light emitting diode zones each comprising one or more light emitting diodes that generate light in response to respective driver currents;
   a group of driver circuits, each driver circuit in the group configured to drive at least one of the light emitting diode zones by controlling the respective driver current for the at least one of the light emitting diode zones in response to a driver control signal, each driver circuit including:
      a power line communication input pin for receiving a power line communication signal;
      a signal detector circuit for generating the driver control signal based on the power line communication signal, the signal detector circuit to generate the driver control signal based on a comparison of the power line communication signal and a time-averaged power line communication signal; and
      a regulator circuit for generating a supply voltage based on the power line communication signal;

a power communication line providing the power line communication signal to the power line communication input pin of each of the driver circuits in the group of driver circuits; and a control circuit for generating the power line communication signal and providing the power line communication signal on the power communication line to power the group of driver circuits and to control the display device via the driver control signals.

8. The display device of claim 7, wherein the signal detector circuit comprises:

an averaging circuit to receive the power line communication signal and to average the power line communication signal over time to generate the time-averaged power line communication signal;

a comparator to compare the power line communication signal to the time-averaged power line communication signal to generate a comparison signal;

a sampling circuit to sample the comparison signal according to a sample timing of a clock signal to generate a sampled signal;

a decoder circuit to decode the sampled signal to generate a decoded output signal; and wherein the regulator circuit powers the comparator, the sampling circuit, and the decoder circuit using the supply voltage.

9. The display device of claim 8, wherein the averaging circuit comprises a resistor-capacitor (RC) filtering circuit.

10. The display device of claim 8, wherein the averaging circuit comprises:

a maximum voltage sample circuit to sample and hold a maximum voltage of the power line communication signal;

a minimum voltage sample circuit to sample and hold a minimum voltage of the power line communication signal; and a voltage divider to generate the average signal as an intermediate voltage between the maximum voltage and the minimum voltage.

11. The display device of claim 7, wherein the power line communication signal supplies a direct current voltage between 3 and 12 volts that is modulated with digital data.

12. The display device of claim 7, wherein the control circuit encodes the power line communication signal with driver control signals by switching between a low voltage and a high voltage according to an encoding scheme in which an average voltage of the power line communication approximates a midpoint between the low voltage and the high voltage irrespective of the logic values of the digital data.

13. The display device of claim 12, wherein the decoder circuit decodes the sampled signal using biphase mark code decoding.

14. A driver circuit for a display device, comprising:

a power line communication input pin to receive a power line communication signal;

a signal detector circuit to generate a driver control signal based on the power line communication signal, the signal detector circuit to generate the driver control signal based on a comparison of the power line communication signal and a time-averaged power line communication signal;

a regulator circuit to receive the power line communication signal and to generate a supply voltage based on the power line communication signal;

control logic powered by the supply voltage to receive the driver control signal and to generate one or more brightness control signals for controlling a driver current through a light emitting diode zone based on the driver control signal; and an output pin to couple to the light emitting diode zone and to sink the driver current through the light emitting diode zone according to the brightness control signals.

15. The driver circuit of claim 14, wherein the signal detector circuit comprises:

an averaging circuit to receive the power line communication signal and to average the power line communication signal over time to generate the time-averaged power line communication signal;

a comparator to compare the power line communication signal to the time-averaged power line communication signal to generate a comparison signal;

a sampling circuit to sample the comparison signal according to a sample timing of a clock signal to generate a sampled signal;

a decoder circuit to decode the sampled signal to generate a decoded output signal; and wherein the regulator circuit powers the comparator, the sampling circuit, and the decoder circuit using the supply voltage.

16. The driver circuit of claim 15, wherein the averaging circuit comprises a resistor-capacitor (RC) filtering circuit.

17. The driver circuit of claim 15, wherein the averaging circuit comprises:

a maximum voltage sample circuit to sample and hold a maximum voltage of the power line communication signal;

a minimum voltage sample circuit to sample and hold a minimum voltage of the power line communication signal; and a voltage divider to generate the average signal as an intermediate voltage between the maximum voltage and the minimum voltage.

18. The driver circuit of claim 14, wherein the power line communication signal supplies a direct current voltage between 3 and 12 volts that is modulated with digital data.

19. The driver circuit of claim 14, wherein the power line communication signal encodes digital data by switching between a low voltage and a high voltage according to an encoding scheme in which an average voltage of the power line communication approximates a midpoint between the low voltage and the high voltage irrespective of the logic values of the digital data.

20. The driver circuit of claim 19, wherein the decoder circuit decodes the sampled signal using biphase mark code decoding.

21. A power line communication detector circuit comprising:

a power line communication input pin to receive a power line communication signal;

a regulator circuit to receive the power line communication signal and to generate a supply voltage for powering an electronic device;

a maximum voltage sample circuit to sample and hold a maximum voltage of the power line communication signal;

a minimum voltage sample circuit to sample and hold a minimum voltage of the power line communication signal; and a voltage divider to generate an average signal as an intermediate voltage between the maximum voltage and the minimum voltage; and a comparator to compare the average signal to the power line communication signal to generate a control signal for controlling the electronic device based on a comparison of the power line communication signal and the average signal.

\* \* \* \* \*